May 29, 1945.　　　E. A. MILLER　　　2,377,168
LOCK-NUT
Filed Jan. 26, 1943
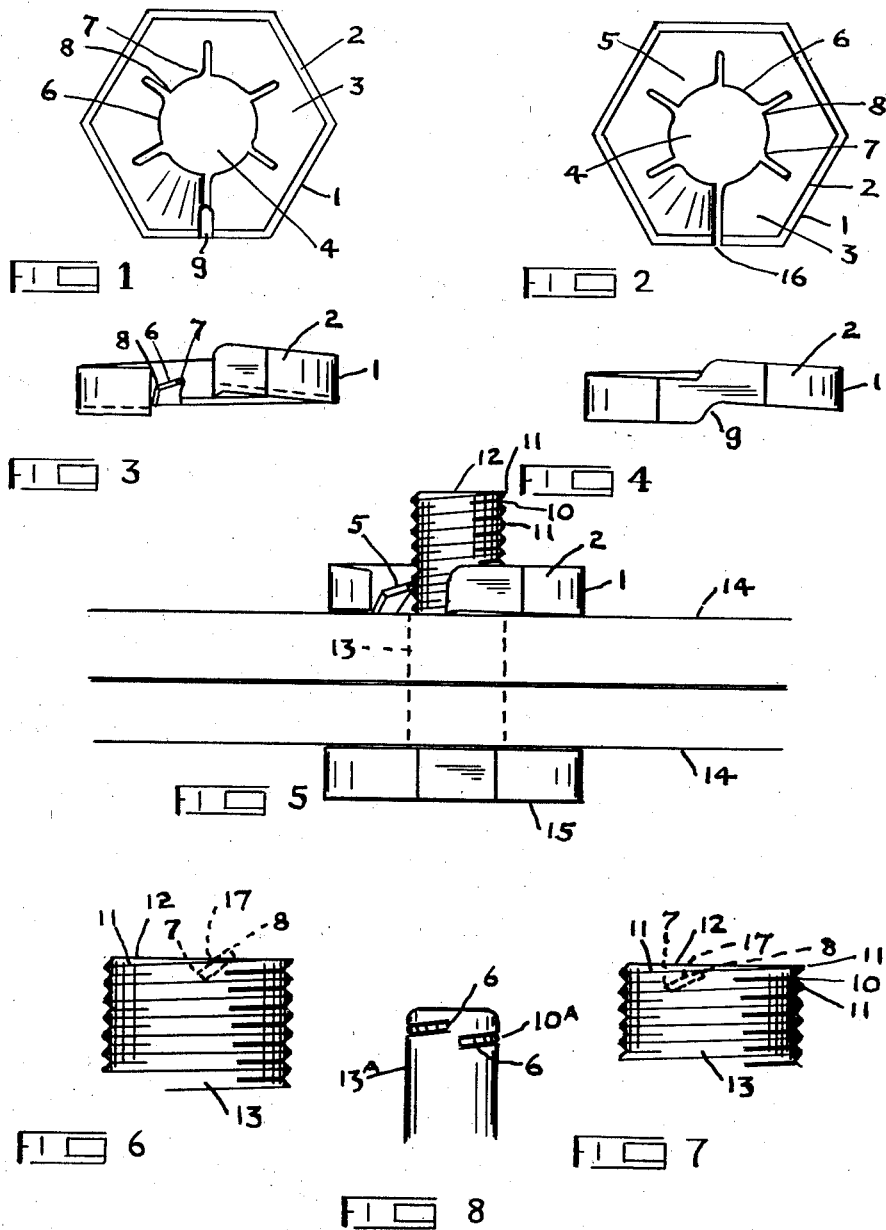
EDWIN AUGUST MILLER *INVENTOR.*
BY
*George Henry Elwell*
ATTY Patented May 29, 1945

2,377,168

UNITED STATES PATENT OFFICE 2,377,168

LOCK NUT

Edwin August Miller, Fairfield, Conn.

Application January 26, 1943, Serial No. 473,579

7 Claims. (Cl. 151—14)

This invention relates to lock-nuts having a flanged spiral base and adapted for both frictional and permanent securement upon a shank.

With reference to the accompanying drawing, the Figure 1 is an upright internal view of the lock-nut having connected spiral ends and illustrating radially positioned segments the terminals of which have certain rounded corners; Figure 2 is a similar internal view, but with the spiral ends disconnected; Figure 3 is a side view of the lock-nut with a portion of the flange removed to expose a pre-formed segment initially engaged out of alignment with the convolutions of a threaded shank; Figure 4 is a complete side view of the lock-nut; Figure 5 is a view of the assembled lock-nut and threaded shank of a headed bolt securing work-pieces, a portion of the nut flange removed to expose a pre-formed segment in alignment under tension with convolutions of a threaded shank; Figure 6 is an enlarged fragmentary view of a threaded shank illustrating in dotted line the initial position of a segment terminal out of alignment; Figure 7 is a similar enlargement illustrating in dotted line the position of a segment terminal in alignment; and Figure 8 is a fragmentary outline of an unthreaded shank illustrating the full lined position of segment terminals in cross-section.

With more particular reference to the accompanying drawing, the numeral 1 designates the lock-nut which is preferably formed from sheet-stock to provide flange 2 around a helical floor 3 of the base, the periphery of the flange 2 assuming the form of a hexagon, as illustrated by the Figures 1 and 2, but may be of any other wrench-receiving contour. A perforation 4 vertically extends centrally through the helical floor 3 which floor 3 is divided into segments 5, each being resilient and extending radially from adjacent the flange 2 and terminating at the perforation 4. The segment terminals 6, as illustrated by the Figures 1 and 2, are each provided with one rounded corner 7, but both corners 7 and 8 may be rounded if desired. The different levels of the helical beginning and ending of the floor 3, including the flange 2, are illustrated by the Figure 1 as having a fixed vertical connection, as at 9.

The invention, including the spiral structure, as aforesaid, more particularly resides in the preformed segments 5 out of the spiral plane, each of the segments 5 being bent or twisted in such manner as to present a rounded corner of a segment terminal 6 substantially to and within the gutter 10 between initial convolutions 11 of the free end 12 of the threaded shank 13, with the opposite corner of the particular segment 5 substantially out of alignment with the said gutter 10, as illustrated by the Figure 6 at the dotted location 17, until, by means of a farther turn of the lock-nut 1 upon the shank 13, the entire segment terminal 6 forces the resilient segment under a twisting tension as the segment terminal 6 is drawn within the gutter 10 and into substantial alignment with the convolutions 11, as illustrated by the Figure 7 at the dotted location 17.

In use, the lock-nut 1 is merely turned upon the free end of the shank 13, in the same manner as any other nut, with the result as aforesaid. Each segment 5 is placed under a twisting tension as it is made to enter and follow the helical gutter 10 down to the work 14 upon which the lock nut descends, the assembled work 14 being held between the nut 1 and an under-shoulder of the bolt-head 15. The nut 1, under such tension of its segments 5, by means of the segment terminals 6 forced within the spiral gutter 10, holds the nut 1 by friction, while a pointed corner 8, upon any attempted reversed turn of the nut 1 upon the shank 13, will dig into the metal of the shank 13 thus preventing such turn by permanently securing the nut 1, but, when both corners 7 and 8 are made rounded, the lock-nut may be sufficiently held upon the shank 13 by means of friction alone.

Not only is the lock-nut 1 adapted to be used upon a threaded shank, as aforesaid, but a further use thereof is shown by the Figure 8 where certain segments 6, in cross-section, are applied by the lock-nut 1 (not illustrated in this figure) to a tapered unthreaded free end of a bolt-shank 13A made of less hard material than that of the lock-nut 1. In thus applying the lock-nut 1, the leading corner of the first contacting segment terminal 6, in its helical engagement with the cylindrical surface of the shank 13A, cuts its own gutter 10A within which the entire terminal 6, including its trailing corner, is forced to follow under the same twisting strain as in the instance of the segment terminals 6 held within the gutter 10 of a threaded shank.

In the slightly modified form of the lock-nut 1, illustrated by the Figure 2, the different extreme levels of the helical beginning and ending of the floor 3 and the flange 2, are made disconnected in the process of manufacture by means of a vertical slit 16 extending from the perforation 4, through the flange 2. This modified form of the lock-nut 1 engages its segment terminals 6 with the threaded or unthreaded shank 13 or 13A, in the same manner as in the preferred form, with one or both corners 7 and 8 of the segment terminals 6 rounded.

It is understood that the lock-nut 1 may be used as aforesaid, or in combination with a holding nut (not illustrated).

I claim:

1. A lock-nut adapted for frictional securement upon a shank, the lock-nut comprising a marginally flanged helical floor structure having vertically extending therethrough a central perforation; multiple resilient segments provided by said floor and radially extending from adjacent the flange and terminating at the perforation and pre-formed out of the helical plane; and segment terminals, each having corners, and so twisted or formed that each terminal is adapted in sequence with the other terminals to engage its leading corner at a guttered depth within the cylindrical surface of the shank as the lock-nut is turned down thereon, the opposite corner of each terminal following, under a twisting strain of the segment, within said path, thus augmenting the frictional securement of the lock-nut upon the shank.

2. A lock-nut adapted for frictional and permanent securement upon a shank, the lock-nut comprising a marginally flanged helical floor structure having vertically extending therethrough a central perforation; multiple resilient segments provided by the floor and radially extending from adjacent the flange and terminating at the perforation and pre-formed out of the helical plane; and segment terminals, each having corners, and so twisted or formed that each terminal is adapted in sequence with the other terminals to engage its leading corner at a guttered depth within the cylindrical surface of the shank as the lock-nut is turned down thereon, the opposite corner of each terminal following, under the twisting strain of the segment, within said path in frictional securement of the lock-nut upon the shank and said opposite corner digging into the metal of the shank to prevent a reversed turn of the lock-nut.

3. A frictionally and permanently secured lock-nut adapted for a threaded shank, the lock-nut comprising a marginally flanged helical floor structure having vertically extending therethrough a central perforation; multiple resilient segments provided by said floor and extending radially from adjacent the flange and terminating at the perforation and pre-formed out of the helical plane; segment terminals, each having corners one or more of which are rounded, each terminal being so twisted or formed as to adapt each terminal to initially engage a leading rounded corner thereof within the gutter between helical convolutions at the free end of a threaded shank as the nut is turned down thereon, the opposite corner being substantially out of alignment with said convolutions until a farther turn of the nut upon the shank forces the segment terminal, under a twisting strain against the resiliency of the segment, into substantial alignment and friction engagement with said convolutions, a segment terminal corner digging into shank metal to prevent a reversed turn of the lock-nut.

4. A lock-nut adapted for frictional securement upon a threaded shank, the lock-nut comprising a marginally flanged helical floor structure having vertically extending therethrough a central perforation; multiple resilient segments provided by said floor and extending radially from adjacent the flange and terminating at the perforation and pre-formed out of the helical plane; segment terminals, each having rounded corners and each terminal being so twisted or formed as to adapt each terminal to initially engage a leading rounded corner thereof within a gutter between helical convolutions at the free end of a threaded shank as the nut is turned down thereon, the opposite corner being substantially out of alignment with said convolutions until a farther turn of the nut upon the shank forces the segment terminal, under a twisting strain against the resiliency of the segment, into substantial alignment and friction engagement with said convolutions.

5. A lock-nut comprising a plate having a circular opening therethrough, the plate surrounding the opening being preformed helically with a marginal wrench-receiving contour; and a plurality of segments formed by slots extending radially from said opening toward said contour, each of the segments having free corners with an arcuate edged terminal therebetween and bordering on the circular opening, each segment being twisted intermediate its length so that, while said corners and arcuate edge remain relatively intact, a leading one of the corners is adapted, upon the nut being positioned upon a threaded bolt, to engage between adjoining threads of the bolt while the arcuate edge and the trailing corner lie out of alignment with said threads but, upon the further turning of the nut upon the bolt, are forced to resistingly follow to engage, against the tension of the twisted segment, the entire terminal within the same groove of a threaded bolt.

6. A lock-nut comprising a plate having a circular opening therethrough, the plate surrounding the opening being preformed helically with a marginal wrench-receiving contour; and a plurality of segments formed by slots radially extending from the opening toward said contour, each of said segments having free corners and an arcuate edge terminal therebetween bordering on said circular opening and one of said corners being rounded and each segment being twisted intermediate its length so that the rounded corner is readily adapted, upon positioning the nut upon a threaded bolt, to engage between adjoining threads of the bolt while the arcuate edge and the other corner remain relatively intact but out of alignment with thread groove thereof, are forced to resistingly follow to engage, upon further turning the nut upon the bolt, the entire terminal under tension between adjoining threads, the unrounded corner being adapted to dig into the surface of the bolt to thereby resist a reversed rotation of the lock-nut.

7. A lock-nut for a threaded bolt comprising a plate having a circular opening therethrough; a helical formation of said plate surrounding said opening and having a marginal wrench-receiving contour; a plurality of segments provided said helical formation between slots radially extending from said opening toward said contour; free corners provided each segment and having between said corners an edged terminal bordering on said opening; and a twisted portion of each segment intermediate its length and slightly changing the angle of said edged terminal out of the plane of said helical formation but with the leading one of said corners within said plane; whereby, upon placing the nut upon a threaded bolt, said leading corner engages within a thread groove and, upon a relative rotation of the nut and bolt, the entire edged terminal is adapted for a forced engagement within said groove against the resisting tension of the twisted portion of the segment.

EDWIN AUGUST MILLER.